(12) United States Patent
McCloskey et al.

(10) Patent No.: US 6,723,823 B2
(45) Date of Patent: Apr. 20, 2004

(54) METHOD OF POLYCARBONATE PREPARATION

(75) Inventors: Patrick Joseph McCloskey, Watervliet, NY (US); Warren William Reilly, Northville, NY (US); Brian James Grimmond, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/167,965

(22) Filed: Jun. 12, 2002

(65) Prior Publication Data

US 2003/0236383 A1 Dec. 25, 2003

Related U.S. Application Data

(63) Continuation-in-part of application No. 09/911,439, filed on Jul. 24, 2001, now Pat. No. 6,420,512.

(51) Int. Cl.[7] .................................................. C08G 6/00
(52) U.S. Cl. ........................ 528/196; 502/200; 502/208; 528/198
(58) Field of Search ................................. 528/196, 198, 528/199; 502/208, 200

(56) References Cited

U.S. PATENT DOCUMENTS

| 5,399,659 A | 3/1995 | Kuhling et al. |
| 6,262,218 B1 | 7/2001 | Inoue et al. |
| 6,300,460 B1 | 10/2001 | McClsokev et al. |
| 6,316,578 B1 | 11/2001 | McCloskev et al. |
| 6,339,138 B1 | 1/2002 | van Hout et al. |
| 6,395,862 B1 * | 5/2002 | Lemmon et al. ............ 528/196 |
| 6,476,249 B1 * | 11/2002 | Ito .............................. 558/265 |

* cited by examiner

*Primary Examiner*—Terressa Boykin
(74) *Attorney, Agent, or Firm*—Andrew J. Caruso; Patrick K. Patnode

(57) ABSTRACT

Mixed alkali metal salts of phosphoric acid in combination with a co-catalyst such as tetramethylammonium hydroxide (TMAH) are excellent transesterification catalysts for use in the preparation of polycarbonate from bisphenol A and diphenyl carbonate. The mixed alkali metal phosphate salts were shown by kinetic measurements made on a model system composed of p-tert-octylphenol and bis(p-cumylphenyl) carbonate to be inherently more potent catalysts than salts of phosphoric acid comprising a single alkali metal ion. In addition to providing higher rates of polymerization, the new catalysts were shown to provide polycarbonates containing reduced levels of Fries rearrangement product relative to polymerization reactions catalyzed by conventional catalyst systems such as sodium hydroxide together with TMAH co-catalyst.

43 Claims, No Drawings

METHOD OF POLYCARBONATE PREPARATION

This application is a continuation-in-part of application Ser. No. 09/911,439, filed Jul. 24, 2001, now U.S. Pat. No. 6,420,512.

BACKGROUND OF THE INVENTION

This invention relates to a method for the preparation of polycarbonate. More particularly the method relates to a method of preparing polycarbonate by the melt reaction of at least one dihydroxy aromatic compound with at least one diaryl carbonate, said melt reaction being mediated by a transesterification catalyst, said transesterification catalyst comprising at least one mixed alkali metal salt of phosphoric acid and a co-catalyst.

Conventionally, polycarbonate is prepared by the reaction of a dihydroxy aromatic compound such as bisphenol A with phosgene in the presence of an aqueous phase comprising an acid acceptor such as sodium hydroxide and an organic solvent such as dichloromethane. Typically, a phase transfer catalyst, such as a quaternary ammonium compound or a low molecular weight tertiary amine, such as triethylamine is added to the aqueous phase to enhance the polymerization rate. This synthetic method is commonly known as the "interfacial" method for preparing polycarbonate.

The interfacial method for making polycarbonate has several inherent disadvantages. First it is a disadvantage to operate a process which requires phosgene as a reactant due to obvious safety concerns. Second it is a disadvantage to operate a process which requires using large amounts of an organic solvent because elaborate precautions must be taken to prevent adventitious release of the volatile solvent into the environment. Third, the interfacial method requires a relatively large amount of equipment and capital investment. Fourth, the polycarbonate produced by the interfacial process is prone to having inconsistent color, higher levels of particulates, and higher chlorine content, which can cause corrosion.

More recently polycarbonate has been prepared on a commercial scale in a solventless process involving the transesterification reaction between a dihydroxy aromatic compound (e.g. bisphenol A) and a diaryl carbonate (e.g., diphenyl carbonate) in the presence of a transesterification catalyst. This reaction is performed in a molten state in the absence of solvent, and is driven to completion by mixing the reactants under reduced pressure and high temperature with simultaneous distillation of the phenol by-product produced by the reaction. This method of preparing polycarbonate is referred to as the "melt" process. In some respects the melt process is superior to the interfacial method because it does not employ phosgene, it does not require a solvent, and it uses less equipment. Moreover, the polycarbonate produced by the melt process does not contain chlorine contamination from the reactants, has lower particulate levels, and has a more consistent color. Therefore it is highly desirable to use the melt process when making polycarbonate in commercial manufacturing processes.

A wide variety of transesterification catalysts have been evaluated for use in the preparation of polycarbonate using the melt process. Alkali metal hydroxides, in particular sodium hydroxide, have proven to be particularly effective as transesterification catalysts. However, while alkali metal hydroxides are useful polymerization catalysts, they are also known to promote Fries reaction along the growing polycarbonate chains which results in the production of branched polycarbonate products. The presence of branching sites within a polycarbonate chain can causes changes in the melt flow behavior of the polycarbonate, which can lead to difficulties in processing.

It would be desirable, therefore, to develop a catalyst system which effects melt polymerization while minimizing undesirable reaction products, such as branched side reaction products.

BRIEF SUMMARY OF THE INVENTION

In one aspect, the present invention provides a method of preparing polycarbonate, said method comprising reacting under melt polymerization conditions in the presence of a transesterification catalyst at least one dihydroxy aromatic compound and at least one diaryl carbonate, said transesterification catalyst comprising at least one mixed alkali metal salt of phosphoric acid and at least one co-catalyst, said co-catalyst comprising a quaternary ammonium salt, a quaternary phosphonium salt or a mixture thereof.

In another aspect, the present invention relates to polycarbonates prepared by the method of the present invention, said polycarbonates having lower levels of Fries product than polycarbonates prepared by conventional melt polymerization methods.

DETAILED DESCRIPTION OF THE INVENTION

The present invention may be understood more readily by reference to the following detailed description of preferred embodiments of the invention and the examples included herein. In this specification and in the claims which follow, reference will be made to a number of terms which shall be defined to have the following meanings.

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein the term "polycarbonate" refers to polycarbonates incorporating structural units derived from one or more dihydroxy aromatic compounds and includes copolycarbonates and polyester carbonates.

As used herein, the term "melt polycarbonate" refers to a polycarbonate made by the transesterification of at least one diaryl carbonate with at least one dihydroxy aromatic compound.

"BPA" is herein defined as bisphenol A and is also known as 2,2-bis(4-hydroxyphenyl)propane, 4,4'-isopropylidenediphenol and p,p-BPA.

As used herein, the term "bisphenol A polycarbonate" refers to a polycarbonate in which essentially all of the repeat units comprise a bisphenol A residue.

As used herein, the term "polycarbonate" includes both high molecular weight polycarbonate and oligomeric polycarbonate. High molecular weight polycarbonate is defined herein as having number average molecular weight, $M_n$, greater than 8000 daltons, and an oligomeric polycarbonate are defined as having number average molecular weight, $M_n$, less than 8000 daltons.

As used herein the term "percent endcap" refers to the percentage of polycarbonate chain ends which are not hydroxyl groups. In the case of bisphenol A polycarbonate prepared from diphenyl carbonate and bisphenol A, a "percent endcap" value of about 75% means that about seventy-five percent of all of the polycarbonate chain ends comprise phenoxy groups while about 25% of said chain ends comprise hydroxyl groups. The terms "percent endcap" and "percent endcapping" are used interchangeably.

As used herein the term "aromatic radical" refers to a radical having a valence of at least one and comprising at least one aromatic ring. Examples of aromatic radicals include phenyl, pyridyl, furanyl, thienyl, naphthyl, phenylene, and biphenyl. The term includes groups containing both aromatic and aliphatic components, for example a benzyl group, a phenethyl group or a naphthylmethyl group. The term also includes groups comprising both aromatic and cycloaliphatic groups for example 4-cyclopropylphenyl and 1,2,3,4-tetrahydronaphthalen-1-yl.

As used herein the term "aliphatic radical" refers to a radical having a valence of at least one and consisting of a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "cycloaliphatic radical" refers to a radical having a valance of at least one and comprising an array of atoms which is cyclic but which is not aromatic, and which does not further comprise an aromatic ring. The array may include heteroatoms such as nitrogen, sulfur and oxygen or may be composed exclusively of carbon and hydrogen. Examples of cycloaliphatic radicals include cyclopropyl, cyclopentyl cyclohexyl, 2-cyclohexylethy-1-yl, tetrahydrofuranyl and the like.

As used herein the term "Fries product" is defined as a structural unit of the product polycarbonate which upon hydrolysis of the product polycarbonate affords a carboxy-substituted dihydroxy aromatic compound bearing a carboxy group adjacent to one or both of the hydroxy groups of said carboxy-substituted dihydroxy aromatic compound. For example, in bisphenol A polycarbonate prepared by a melt reaction method in which Fries reaction occurs, the Fries product includes those structural features of the polycarbonate which afford 2-carboxy bisphenol A upon complete hydrolysis of the product polycarbonate.

The terms "Fries product" and "Fries group" are used interchangeably herein.

The terms "Fries reaction" and "Fries rearrangement" are used interchangeably herein.

As used herein the term "Fries level" refers to the amount of Fries product present in a product polycarbonate.

As mentioned, the present invention relates to a method of preparing polycarbonate, said method comprising reacting under melt polymerization conditions in the presence of a transesterification catalyst at least one dihydroxy aromatic compound and at least one diaryl carbonate, said transesterification catalyst comprising at least one mixed alkali metal salt of phosphoric acid and at least one co-catalyst, said co-catalyst comprising a quaternary ammonium salt, a quaternary phosphonium salt or a mixture thereof. The mixed alkali metal salt comprises at least two different alkali metal ions selected from the group consisting of cesium ions, sodium ions, and potassium ions. Such mixed alkali metal phosphate catalysts are conveniently prepared by addition of a first alkali metal hydroxide to an aqueous solution of phosphoric acid followed by the addition of a second alkali metal hydroxide to the mixture. Such additions are conveniently carried out as titrations in which the amounts of alkali metal hydroxides added may be monitored by a change in the pH of the phosphoric acid solution. For example, an aqueous solution of phosphoric acid is first treated with about 0.95 equivalents of cesium hydroxide and subsequently with 0.6 equivalents of sodium hydroxide. The resultant aqueous solution comprises the mixed alkali metal phosphate $CsNaHPO_4$, which has been found to possess improved catalytic properties over other alkali metal phosphates containing only a single species of alkali metal ion. Typically, the mixed alkali metal phosphate catalyst is added to the polymerization as an aqueous solution. Thus, the preparation and use of the mixed alkali metal phosphate catalysts of the present invention is especially convenient.

When the mixed alkali metal phosphate catalyst comprises cesium and sodium ions it has been found that catalytic activity is optimal when said catalyst comprises between about 0.85 and about 1.0 equivalents of cesium and about 0.1 to about 0.6 equivalents of sodium per phosphoric acid equivalent. When the mixed alkali metal phosphate catalyst comprises potassium and sodium ions it has been found that catalytic activity is optimal when said catalyst comprises between about 0.85 and about 1.0 equivalents of potassium and about 0.1 to about 1 equivalents of sodium per phosphoric acid equivalent.

In melt a polymerization reaction of one or more dihydroxy aromatic compounds and one or more diaryl carbonates, the mixed alkali metal salt of phosphoric acid is typically employed in an amount corresponding to between about $1\times10^{-8}$ and about $1\times10^{-3}$, preferably about $1\times10^{-6}$ and about $2.5\times10^{-4}$ moles of mixed alkali metal salt of phosphoric acid per mole dihydroxy aromatic compound.

The dihydroxy aromatic compounds used according to the method of the present invention may be dihydroxy benzenes, for example hydroquinone (HQ), 2-methylhydroquinone, resorcinol, 5-methylresorcinol and the like; dihydroxy naphthalenes, for example 1,4-dihydroxynathalene, 2,6-dihydroxynaphthalene, and the like; and bisphenols, for example bisphenol A and 4,4'-sulfonyldiphenol. Typically, the dihydroxy aromatic compound comprises at least one bisphenol having structure I

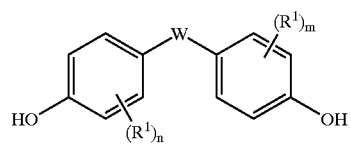

I wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

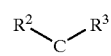

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

Bisphenols having structure I are illustrated by bisphenol A; 2,2-bis(4-hydroxy-3-methylphenyl)propane; 2,2-bis(3- chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; 1,1-bis(4-hydroxyphenyl)-3,3,5-trimethylcyclohexane, and the like.

Typically, the diaryl carbonate used is at least one diaryl carbonate having structure II

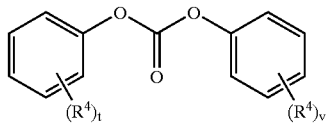

II wherein $R^4$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and t and v are independently integers 0–5.

Diaryl carbonates II are illustrated by diphenyl carbonate, bis(4-methylphenyl)carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl)carbonate, bis(2-nitrophenyl) carbonate, bis(methyl salicyl) carbonate, and the like.

The transesterification catalyst used according to method of the present invention comprises at least one co-catalyst, said co-catalyst being present in an amount corresponding to between about $1\times10^{-6}$ and about $1\times10^{-2}$, preferably between about $1\times10^{-5}$ and about 2.5 $10^{-4}$ moles of co-catalyst per mole of dihydroxy aromatic compound employed. Typically, the co-catalyst is at least one quaternary ammonium salt, at least one quaternary phosphonium salt, or a mixture thereof.

In one embodiment of the present invention the co-catalyst is a quaternary ammonium compound having structure III

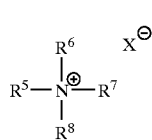

III wherein $R^5$–$R^8$ are independently a $C_1$–$C_{20}$ alkyl group, $C_4$–$C_{20}$ cycloalkyl group, or a $C_4$–$C_{20}$ aryl group; and $X^-$ is an organic or inorganic anion. Typically the anion $X^-$ is selected from the group consisting of hydroxide, halide, carboxylate, phenoxide, sulfonate, sulfate, carbonate, and bicarbonate. Hydroxide is frequently preferred. Quaternary ammonium salts having structure III are illustrated by tetramethylammonium hydroxide, tetrabutylammonium hydroxide, and the like.

In an alternate embodiment of the present invention the co-catalyst is a quaternary phosphonium compound having structure IV

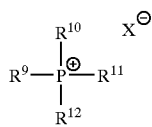

IV wherein $R^9$–$R^{12}$ are independently a $C_1$–$C_{20}$ alkyl group, $C_4$–$C_{20}$ cycloalkyl group, or a $C_4$–$C_{20}$ aryl group; and $X^-$ is an organic or inorganic anion. Typically the anion $X^-$ is selected from the group consisting of hydroxide, halide, carboxylate, phenoxide, sulfonate, sulfate, carbonate, and bicarbonate. Hydroxide is frequently preferred. Quaternary phosphonium salts having structure IV are illustrated by tetrabutylphosphonium hydroxide, tetraoctylphosphonium hydroxide, tetrabutylphosphonium acetate, and the like.

In structures III and IV, the anion $X^-$ is typically an anion selected from the group consisting of hydroxide, halide, carboxylate, phenoxide, sulfonate, sulfate, carbonate, and bicarbonate. With respect to transesterifcation catalysts comprising co-catalysts having structures III and IV, where $X^-$ is a polyvalent anion such as carbonate or sulfate it is understood that the positive and negative charges in structures III and IV are properly balanced. For example, in tetrabutylphosphonium carbonate where $R^9$–$R^{12}$ in structure IV are each butyl groups and $X^-$ represents a carbonate anion, it is understood that $X^-$ represents ½ ($CO_3^{-2}$).

The term "melt polymerization conditions" is understood to mean those conditions necessary to effect reaction between a diaryl carbonate and a dihydroxy aromatic compound in the presence of a transesterification catalyst. The reaction temperature is typically in the range of about 100° C. to about 350° C., more preferably about 180° C. to about 310° C. The pressure may be at atmospheric pressure, supra-atmospheric pressure, or a range of pressures from atmospheric pressure to about 15 torr in the initial stages of the reaction, and at a reduced pressure at later stages, for example in the range of about 0.2 to about 15 torr. The reaction time is generally about 0.1 hours to about 10 hours.

The method of the present invention may be conducted as a batch process or as a continuous process. In either case, the melt polymerization conditions used may comprise two or more distinct reaction stages, for example, a first reaction stage in which the starting diaryl carbonate and dihydroxy aromatic compound are converted into an oligomeric polycarbonate and a second reaction stage wherein the oligomeric polycarbonate formed in the first reaction stage is converted to high molecular weight polycarbonate. Such "staged" polymerization reaction conditions are especially suitable for use in continuous polymerization systems wherein the starting monomers are oligomerized in a first reaction vessel and the oligomeric polycarbonate formed therein is continuously transferred to one or more downstream reactors in which the oligomeric polycarbonate is converted to high molecular weight polycarbonate. Typically, in the oligomerization stage the oligomeric polycarbonate produced has a number average molecular weight of from about 1000 to about 7500 daltons. In one or more subsequent polymerization stages the number average molecular weight of the polycarbonate is increased to between about 8000 and about 25000 daltons.

In one embodiment, the process is conducted as a two stage process. In the first stage of this embodiment, the co-catalyst, for example tetramethylammonium hydroxide is introduced into the reaction system comprising the dihydroxy aromatic compound and the diaryl carbonate. The first stage is conducted at a temperature of 270° C. or lower, preferably between about 150° C. and about 250° C., more preferably between about 150° C. and about 230° C. The duration of the first stage is preferably from about 2 minutes to about 5 hours, even more preferably about 2 minutes to about 3 hours at a pressure form atmospheric pressure to 100 torr. It is generally preferable that oxygen be excluded from the reaction mixture during the oligomerization and subsequent polymerization stages. Oxygen exclusion is conveniently achieved using known techniques, for example, maintaining a positive pressure of nitrogen in the system before and after evacuation.

The mixed alkali metal salt of phosphoric acid may be added in the first stage along with the co-catalyst. Alternatively the mixed alkali metal salt of phosphoric acid is introduced into the product from the first stage and further polycondensation is conducted. The salt of the mixed alkali metal salt of phosphoric acid may be added in its entire amount in the second stage, or it may be added in batches in the second and subsequent stages so that the total amount is within the aforementioned ranges.

It is preferable in the second and any subsequent stages of the polycondensation step for the reaction temperature to be raised while the reaction system is reduced in pressure compared to the first stage. Typically, in the late stages of the polymerization reaction the reaction mixture is heated at temperatures in a range between about 240° C. and 320° C. under reduced pressure of about 5 mm Hg or less, and preferably 1 mm Hg or less.

In one embodiment of the present invention at least one dihydroxy aromatic compound and at least one diaryl carbonate are reacted in the presence of a transesterification catalyst under melt polymerization conditions in the presence of a branching agent to produce a product polycarbonate which is branched. Typically, the branching agent may be a trisphenol such as 1,1,1-tris(4-hydroxyphenyl)ethane, THPE. Other branching agents suitable for use according to the method of the present invention include triacids such as trimellitic acid, 9-carboxyoctadecandioic acid, and the corresponding phenyl esters thereof. Typically, the branching agent is used in an amount corresponding to about 0.001 to about 0.03 moles of branching agent per mole of dihydroxy aromatic compound.

Additionally, the method of the present invention may carried out in the presence of an endcapping agent. Thus, at least one endcapping agent, at least one dihydroxy aromatic compound, at least one diaryl carbonate, and at least one transesterification catalyst, said transesterification catalyst comprising at least one mixed alkali metal salt of phosphoric acid and at least one co-catalyst, are reacted under melt polymerization conditions to provide a product polycarbonate comprising terminal groups derived from the endcapping agent. Typically, the endcapping agent is a monofunctional phenol such as cardanol, p-cresol, p-tert-butylphenol, and p-cumylphenol. For example when p-tert-butylphenol is used as the endcapping agent the product polycarbonate prepared according to the method of the present invention comprises terminal p-tert-butylphenoxy groups.

In some aspects the method of the present invention is superior to earlier melt polymerization methods based upon the speed at which the polymerization reaction occurs under the influence of the mixed alkali metal phosphate catalyst co-catalyst combination employed. Thus, higher molecular weight product polycarbonates are obtained in a shorter period of time. Additionally, the product polycarbonates prepared according to the method of the present invention typically possess lower levels of Fries product than product polycarbonates prepared under comparable conditions of reaction time, reaction temperature, catalyst loading and the like, using conventional catalyst systems. In general, it is desirable to limit the amount of Fries product present in the product polycarbonate to the greatest extent possible since high Fries levels can produce discoloration and serve as sites for uncontrolled polymer branching which can affect the melt flow properties of the product polycarbonate. Generally, the level of Fries rearrangement product present in high molecular weight polycarbonate prepared according to the method of the present invention is less than about 1000 parts per million, preferably less than 500 parts per million.

It is understood, especially for melt reactions of the type presented in the instant invention, that the purity of the monomers employed may strongly affect the properties of the product polycarbonate. Thus, it is frequently desirable that the monomers employed be free of, or contain only very limited amounts of, contaminants such as metal ions, halide ions, acidic contaminants and other organic species. This may be especially true in applications such as optical disks, (e.g. compact disks) where contaminants present in the polycarbonate can affect disk performance. Typically the concentration of metal ions, for example iron, nickel, cobalt, sodium, and postassium, present in the monomer should be less than about 10 ppm, preferably less than about 1 ppm and still more preferably less than about 100 parts per billion (ppb). The amount of halide ion present in the polycarbonate, for example fluoride, chloride and bromide ions, should be minimized in order to inhibit the absorption of water by the product polycarbonate as well as to avoid the corrosive effects of halide ion on equipment used in the preparation of the polycarbonate. Certain applications, for example optical disks, may require very low levels of halide ion contaminants. Preferably, the level of halide ion present in each monomer employed should be less than about 1 ppm. The presence of acidic impurities, for example organic sulfonic acids which may be present in bisphenols such as BPA, should be minimized since only minute amounts of basic catalysts are employed in the oligomerization and subsequent polymerization steps. Even a small amount of an acidic impurity may have a large effect on the rates of oligomerization and polymerization since it may neutralize a substantial portion of the basic co-catalyst employed. Lastly, the tendency of polycarbonates to degrade at high temperature, for example during molding, with concomitant loss of molecular weight and discoloration correlates strongly with the presence of contaminating species within the polycarbonate. In general, the level of purity of a product polycarbonate prepared using a melt reaction method such as the instant invention will closely mirror the level of purity of the starting monomers.

The polycarbonate made by the method of the present invention may optionally be blended with any conventional additives, including but not limited to dyestuffs, UV stabilizers, antioxidants, heat stabilizers, and mold release agents, in order to facilitate the formation and use of a molded article. In particular, it is preferable to form a blend of the polycarbonate made by the method of the present invention and additives which serve as process aids during the molding process and which confer additional stability upon the molded article. The blend may optionally comprise from about 0.0001 to about 10% by weight of the desired additives, more preferably from about 0.0001 to about 1.0% by weight of the desired additives.

Substances or additives which may be added to the polycarbonate of this invention, include, but are not limited to, heat-resistant stabilizers, UV absorbers, mold-release agents, antistatic agents, slip agents, antiblocking agents, lubricants, anticlouding agents, coloring agents, natural oils, synthetic oils, waxes, organic fillers, inorganic fillers, and mixtures thereof.

Examples of the aforementioned heat-resistant stabilizers, include, but are not limited to, phenol stabilizers, organic thioether stabilizers, organic phosphite stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers, and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

EXAMPLES

The following examples are set forth to provide those of ordinary skill in the art with a detailed description of how the methods claimed herein are carried out and evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) relative to a polycarbonate standard of known molecular weight.

Fries content was measured by the KOH methanolysis of resin and is reported as parts per million (ppm). The Fries content was determined as follows. First, 0.50 grams of the product polycarbonate was dissolved in 4.0 ml of THF (containing p-terphenyl as internal standard). Next, 3.0 mL of 18% KOH in methanol was added to this solution. The resulting mixture was stirred for two hours at room temperature. Next, 1.0 mL of acetic acid was added, and the mixture was stirred for 5 minutes. Potassium acetate by-product was allowed to crystallize over 1 hour. The solid was filtered off and the resulting filtrate was analyzed by high performance liquid chromatography (HPLC) using p-terphenyl as the internal standard.

Catalyst solutions containing mixed alkali metal salts of phosphoric acid were prepared by titrating a solution of phosphoric acid with two solutions of alkali metal hydroxide. For example, a solution of phosphoric acid ($1\times10^{-3}$ moles $H_3PO_4$ per liter) was treated with between 0.85 and 0.95 equivalents of cesium hydroxide using a solution of CsOH in water ($1\times10^{-1}$ moles CsOH per liter). To the resultant solution was then added between 0 and about 1 equivalents of sodium hydroxide or potassium hydroxide. The NaOH or KOH was added as a solution of NaOH or KOH in water, said solution having a concentration of about $1\times10^{-1}$ moles of NaOH or KOH per liter. The pH of the catalyst solution was then recorded. The catalyst solution comprised $CsNaHPO_4$ or $CsKHPO_4$, mixed alkali metal salts of phosphoric acid, and was employed in melt polymerization reactions to form polycarbonate.

Reactions were carried out in a 1 liter glass batch reactor equipped with a solid nickel helical agitator. The interior surface of the glass reactor was passivated by immersing the reactor in a dilute hydrochloric acid over night, thoroughly rinsing the reactor with deionized water (18 mega-Ohm), and drying overnight at 70° C. in a drying oven. During polymerization reactions the reactor was heated by means of a fluidized sand bath with a PID controller. The temperature of the reactor was measured on the outside of the reactor near the interface between the reactor wall and sand bath. The reactor was equipped with a distillation head and receiving vessel. The pressure inside of the reactor was controlled by a nitrogen bleed into a vacuum pump connected through a cold trap to the receiving vessel. Higher pressures (760 mm Hg to 40 mm Hg) were measured with a mercury barometer, and lower pressures (40 mm Hg to 1 mm Hg) were measured with an Edward pirani gauge. The reactor was charged with 0.6570 mol BPA and 0.7096 mol diphenyl carbonate and purged with nitrogen by evacuating the reactor and then introducing nitrogen gas. This nitrogen purge procedure was repeated three times. After the final nitrogen exchange, the reactor was brought to about atmospheric pressure under nitrogen and submerged into the fluidized bath which was at 180° C. After five minutes, agitation was begun at 250 rpm. After an additional ten minutes, the reactants were fully melted and the mixture was homogeneous. The mixed alkali metal salt of phosphoric acid catalyst ($1.00\times10^{-6}$ mole per mole BPA) and tetramethylammonium hydroxide co-catalyst (TMAH, $2.4\times10^{-4}$ mole per mole BPA) were added sequentially as aqueous solutions. The volume added of the solution of the mixed alkali metal salt of phosphoric acid catalyst was about 600 microliters. The volume of the solution of the tetramethylammonium hydroxide co-catalyst was about 148 microliters. When the addition of the catalyst and co-catalyst addition was complete, timing was begun and the temperature was ramped to 240° C. over a five minute period. When a temperature of 240° C. was reached, the pressure in the reactor was reduced to 180 mm Hg. Phenol began to distill as the pressure was reduced. After 25 minutes, the pressure was again reduced to 100 mm Hg and the reaction mixture was maintained at 240° C. and 100 mm Hg for 45 minutes. The temperature was then ramped to 260° C. over a five minute period and the pressure was further reduced to 15 mm Hg. The reaction mixture was maintained at 260° C. and 15 mm Hg for 45 minutes. The temperature was then ramped to 270° C. over a five minute period and the pressure was lowered to 2 mm Hg. These conditions were maintained for 10 minutes. The temperature was then ramped to the final "finishing temperature" over five minutes and the pressure was reduced to 1.1 mm Hg. The finishing temperature was between about 280° C. and about 310° C. (See Tables). After 30 minutes, the reactor was removed from the sand bath and the molten product polycarbonate was poured into liquid nitrogen to quench the reaction.

Unless otherwise noted, the mixed alkali metal salt of phosphoric acid catalyst was added at $1.0\times10^{-6}$ moles per mole BPA, and TMAH was added at $2.5\times10^{-4}$ moles per mole BPA.

Comparative Examples 1–6

In Comparative Examples 1–6 the catalyst was a cesium phosphate solution prepared by titration of a $1\times10^{-3}$ molar solution of phosphoric acid in water with a 0.1 molar solution of cesium hydroxide (CsOH). The pH of the catalyst solution and the number of equivalents of cesium ion present were varied. The polymerizations in Comparative Examples 1–6 were conducted as described in the general experimental description. TMAH ($2.5\times10^{-4}$ mole per mole BPA) was used as a co-catalyst. The data in Table 1 illustrate the effect of increasing cesium ion concentration on polymerization rate (as judged by the molecular weight of the product polycarbonate) and Fries level in the product polycarbonate.

TABLE 1

EFFECT OF CESIUM ION CONCENTRATION ON POLYMERIZATION RATE AND FRIES SELECTIVITY (Catalyst = CsOH + $H_3PO_4$, Co-Catalyst = TMAH)

| Example | Equivalents "Cs" | pH of catalyst solution[a] | Finishing Temperature | Product Mn | Fries Level (ppm) |
|---|---|---|---|---|---|
| CE-1 | 0.855 | 3.20 | 310° C. | 2199 | none observed |
| CE-2 | 0.900 | 3.42 | 310° C. | 8774 | 377 |
| CE-3 | 0.940 | 3.72 | 310° C. | 10045 | 536 |
| CE-4 | 0.975 | 4.40 | 310° C. | 10104 | 1167 |
| CE-5 | 0.990 | 5.03 | 310° C. | 11222 | 1152 |
| CE-6 | 01.145 | 6.30 | 310° C. | 11448 | 1682 |

[a]No co-catalyst is present in these catalyst solutions.

Comparative Examples 7–12

Comparative Examples 7–12 are provided to illustrate the behavior of a catalyst system consisting of sodium hydroxide ($1\times10^{-6}$ mole per mole BPA) together with TMAH co-catalyst ($2.5\times10^{-4}$ mole per mole BPA) relative to Comparative Examples 1–6 and the working Examples 1–32 presented. The polymerizations were run as described in the general experimental description using sodium hydroxide instead of the mixed alkali metal salt of phosphoric acid salt catalyst of the present invention. Final "finishing temperatures" are listed in Table 2.

TABLE 2

COMPARATIVE EXAMPLES ILLUSTRATING POLYMERIATION REACTIONS CATALYZED BY SODIUM HYDROXIDE + TMAH

| Example | Equivalents NaOH[a] | Finishing Temperature | Product Mn | Fries Level (ppm) |
|---|---|---|---|---|
| CE-7 | 1.0 | 280° C. | 6784 | 288 |
| CE-8 | 0.4 | 280° C. | 5551 | 72 |
| CE-9 | 1.0 | 295° C. | 8500 | 622 |
| CE-10 | 0.1 | 310° C. | 2403 | None observed |
| CE-11 | 0.2 | 310° C. | 4241 | —* |
| CE-12 | 1.0 | 310° C. | 9155 | 1195 |

[a]1.0 equivalent of NaOH is $1 \times 10^{-6}$ moles of NaOH per mole of BPA.
*Fries level not determined As can be seen by comparing the data in Tables 1 and 2, the use of more than 0.94 equivalents of cesium (CE-3, catalyst solution pH=3.72) provides no advantage in terms of Fries selectivity over sodium hydroxide. The use of a catalyst solution prepared from aqueous phosphoric acid and 0.94 equivalents of cesium hydroxide or less (Comparative Examples 1–3), lowers the amount of Fries product produced but also lowers the overall polymerization rate which results in a lower molecular weight product polycarbonate. High molecular weight polycarbonate can be achieved using a catalyst solution prepared from an aqueous solution of phosphoric acid and more than 0.94 equivalents of cesium hydroxide (Comparative Examples 4–6) but as the molecular weight of the product polycarbonate is increases so too does the level of Fries product.

Examples 1–32

Data for melt polymerizations using mixed sodium-cesium salts of phosphoric acid are given in Table 3 below. The data given for Examples 1–15 together with the Comparative Examples illustrate the synergistic effect of sodium ion in catalyst systems prepared from cesium hydroxide and phosphoric acid, "cesium phosphate" catalysts.

TABLE 3

SYNERGISTIC EFFECT OF SODIUM HYDROXIDE ON "CESIUM PHOSPHATE" CATALYST (TMAH PRESENT IN ALL CASES)

| Example | Equiv. "Cs" | pH of catalyst soln.[a] | Equiv. NaOH added | PH of catalyst soln. + NaOH | Finishing Temperature | Product Mn | Fries Level (ppm) |
|---|---|---|---|---|---|---|---|
| CE-13 | 0.900 | 3.42 | — | — | 280° C. | 1638 | n.d.[c] |
| 1 | 0.900 | 3.42 | 0.2 | 5.79 | 280° C. | 6066 | 42 |
| 2 | 0.900 | 3.42 | 0.4 | 6.13 | 280° C. | 6493 | 50 |
| 3 | 0.900 | 3.42 | 0.6 | 6.63 | 280° C. | 7088 | 88 |
| CE-7 | 0 | — | 1.0[b] | — | 280° C. | 6784 | 288 |
| CE-14 | 0.900 | 3.42 | 0 | — | 295° C. | 5854 | 31 |
| 4 | 0.900 | 3.42 | 0.2 | 5.79 | 295° C. | 8145 | 238 |
| 5 | 0.900 | 3.42 | 0.4 | 6.13 | 295° C. | 8246 | 315 |
| 6 | 0.900 | 3.42 | 0.6 | 6.63 | 295° C. | 8773 | 250 |
| CE-9 | 0 | — | 1.0[b] | — | 295° C. | 8500 | 622 |
| CE-2 | 0.900 | 3.42 | 0 | — | 310° C. | 8774 | 377 |
| 7 | 0.900 | 3.42 | 0.2 | 5.79 | 310° C. | 9369 | 467 |
| 8 | 0.900 | 3.42 | 0.4 | 6.13 | 310° C. | 8992 | 608 |
| 9 | 0.900 | 3.42 | 0.6 | 6.63 | 310° C. | 9808 | 796 |
| CE-12 | 0 | — | 1.0[b] | — | 310° C. | 9155 | 1195 |
| CE-15 | 0.940 | 3.72 | 0 | — | 280° C. | 3478 | <20 |
| 10 | 0.940 | 3.72 | 0.1 | 5.42 | 280° C. | 4466 | <20 |
| 11 | 0.940 | 3.72 | 0.2 | 6.00 | 280° C. | 5806 | <20 |
| 12 | 0.940 | 3.72 | 0.3 | 6.30 | 280° C. | 6802 | 42 |
| CE-16 | 0.940 | 3.72 | 0 | — | 295° C. | 6957 | 45 |
| 13 | 0.940 | 3.72 | 0.1 | 5.42 | 295° C. | 8307 | 222 |
| 14 | 0.940 | 3.72 | 0.2 | 6.00 | 295° C. | 8759 | 380 |
| CE-3 | 0.940 | 3.72 | 0 | — | 310° C. | 10045 | 536 |
| 15 | 0.940 | 3.72 | 0.1 | | 310° C. | 10171 | 444 |

[a]No TMAH is present in these catalyst solutions
[b]1.0 equivalent of NaOH is $1 \times 10^{-6}$ moles of NaOH per mole of BPA
[c]"n.d." = none detected Data for melt polymerizations using mixed sodium-potassium salts of phosphoric acid are given in Table 4 below. The data given for Examples 16–32 together with the Comparative Examples illustrate the synergistic effect of sodium ion in catalyst systems prepared from potassium hydroxide and phosphoric acid, "potassium phosphate" catalysts.

TABLE 4

SYNERGISTIC EFFECT OF SODIUM HYDROXIDE ON "POTASSIUM PHOSPHATE" CATALYST (TMAH PRESENT IN ALL CASES)

| Example | Equiv. "K" | pH of catalyst soln.[a] | Equiv. NaOH added[b] | PH of catalyst soln. + NaOH | Finishing Temperature | Product Mn | Fries Level (ppm)[c] |
|---|---|---|---|---|---|---|---|
| 16 | | 3.7 | 0.6 | | 295° C. | 7490 | 102 |
| 17 | | 3.7 | 0.6 | | 310° C. | 9556 | 407 |
| CE-17 | 1.0 | 4.8 | 0 | — | 280° C. | 1550 | n.d.[c] |
| 18 | 1.0 | 4.8 | 0.4 | 6.5 | 280° C. | 4459 | 41 |
| 19 | 1.0 | 4.8 | 0.6 | 6.83 | 280° C. | 5542 | 25 |
| 20 | 1.0 | 4.8 | 0.8 | 7.38 | 280° C. | 6430 | 62 |
| 21 | 1.0 | 4.8 | 1.0[b] | | 280° C. | 6870 | 80 |
| 22 | 1.0 | 4.8 | 0.6 | 6.83 | 295° C. | 6909 | 97 |
| 23 | 1.0 | 4.8 | 0.8 | 7.38 | 295° C. | 7893 | 141 |
| 24 | 1.0 | 4.8 | 1.0[b] | | 295° C. | 8168 | 203 |
| CE-18 | 1.0 | 4.8 | 0 | — | 310° C. | 6279 | 109 |
| 24 | 1.0 | 4.8 | 0.6 | 6.83 | 310° C. | 8874 | 242 |
| 25 | 1.0 | 4.8 | 0.8 | 7.38 | 310° C. | 9070 | 364 |
| CE-19 | | 5.2 | 0 | — | 280° C. | 1699 | n.d.[c] |
| 26 | | 5.2 | 0.6 | | 280° C. | 7039 | 56 |
| 27 | | 5.2 | 0.6 | | 295° C. | 8173 | 215 |
| 28 | | 5.2 | 0.6 | | 310° C. | 9473 | 414 |
| 29 | | 6.0 | 0.4 | | 280° C. | 6189 | 69 |
| CE-20 | | 6.5 | 0 | — | 280° C. | 2216 | n.d.[c] |
| 30 | | 6.5 | 0.4 | | 280° C. | 6507 | 93 |
| 31 | | 6.5 | 0.4 | | 295° C. | 8047 | 292 |
| 32 | | 6.5 | 0.4 | | 310° C. | 9762 | 457 |
| CE-7 | 0 | — | 1.0 | — | 280° C. | 6784 | 288 |
| CE-9 | 0 | — | 1.0 | — | 295° C. | 8500 | 622 |
| CE-12 | 0 | — | 1.0 | — | 310° C. | 9155 | 1195 |

[a]No TMAH is present in these catalyst solutions
[b]1.0 equivalent of NaOH is $1 \times 10^{-6}$ moles of NaOH per mole of BPA.
[c]"n.d." = none detected The data in Tables 3 and 4 illustrate the effectiveness of the mixed alkali metal salts of phosphoric acid as melt polymerization depends on the reaction temperature as well alkali metal used. Comparative Example 17 illustrates the behavior of a catalyst prepared by treating aqueous phosphoric acid with 1 equivalent of potassium hydroxide ($KH_2PO_4$). Thus at the stoichiometric equivalence point for the $KH_2PO_4$ (pH=4.8) salt formation, the catalyst is ineffective as a melt polymerization catalysts even in the presence of the co-catalyst (TMAH). Similarly, $NaH_2PO_4$ is ineffective as a melt polymerization catalyst, the presence of a tetramethylammonium hydroxide (TMAH) or terabutylphosphonium hydroxide co-catalyst notwithstanding, even when final finishing temperatures as high as 310° C. are used. Of the simple mono alkali metal phosphates, $NaH_2PO_4$, $KH_2PO_4$, and $CsH_2PO_4$, only the mono cesium salt was effective as a polymerization catalyst relative to sodium hydroxide (See Comparative Examples 3–6, Table 1 relative to Comparative Example 12 of Table 2). In range finding experiments it was found that although the disodium salt of phosphoric acid was ineffective as a polymerization catalyst under the melt reaction condition described here, the dipotassium salt ($K_2PO_4$) provided excellent polymerization rates. As is illustrated in the Examples of Tables 3 and 4 high reaction rates and low Fries levels can be achieved when, in addition to properly adjusting the of the ratio of cesium hydroxide or potassium hydroxide to phosphoric acid, between about 0.1 equivalents and about 1.0 equivalents of sodium hydroxide is added to the catalyst solution. Equivalents of sodium hydroxide are referenced to phosphoric acid. One equivalent of sodium hydroxide corresponds to 1 mole of sodium hydroxide per 1 mole of phosphoric acid. In the experiments presented here, the ratio of cesium hydroxide or potassium hydroxide to phosphoric acid is reflected by the initial pH of the mixture prepared from aqueous phosphoric acid and cesium hydroxide or potassium hydroxide (See Column headed "pH of catalyst soln." In Tables 3 and 4). The use of cesium salts is optimal when less than one equivalent of cesium hydroxide is used to prepare the initial catalyst solution (cesium phosphate solution). The addition of between 0.1 and about 0.6 equivalents of NaOH to the initial catalyst solution provides the mixed alkali metal phosphate catalyst comprising both sodium and cesium ions. The use of the mixed alkali metal phosphate catalyst affords high molecular weight product polycarbonate containing reduced levels of Fries product (e.g. Compare Example 15 with Comparative Examples 3 and 12, Table 3) and permits the maximization polymerization rate while keeping Fries product formation to a minimum.

The potassium salts (Table 4) appear to be inherently less active catalysts than the cesium salts featured in Table 3 and a useful synergistic effect is noted when a slightly larger amount of sodium hydroxide is added used to produce a mixed alkali metal phosphate catalyst which is somewhat richer in sodium ion than the corresponding catalysts in Table 3 having about the same activity. Finally, it should be noted that the product polycarbonate molecular weight as well as the level of Fries product it contains reflects the "finishing temperature" employed (i.e. final polymerization temperature) in the polymerization reaction.

Transesterification Kinetics Model Systems

A series of kinetics measurements were made in model reaction systems in order to probe the inherent catalytic activity of the mixed alkali metal phosphate catalysts. No co-catalyst was employed in these model reactions. Rate constants and activation energies for several of the catalyst systems used in the present invention were evaluated. All glassware employed in the kinetic study was washed with dilute aqueous HCl, rinsed with deionized water and then soaked in deionized water for 12 hr followed by drying. Para-tert-octylphenol ("OP") was recrystallized from hot hexanes (1 g: 10 mL) at least three times. Bis(p-cumylphenyl) carbonate ("PCPC") was recrystallized from a minimum amount of boiling ethanol. The purity of the octylphenol was checked by heating a 2:1 molar mixture of "OP" and "PCPC" to 240° C. for 5 minutes, 220° C. for 10 minutes or 200° C. for 15 minutes and then analyzing the reaction mixture by HPLC. The octylphenol was considered to be of sufficient purity if conversion of the starting materials to the transesterification cross products (p-cumylphenyl 4-tert-octylphenyl) carbonate and bis(4-tert-octylphenyl) carbonate was less then 1%.

Catalyst samples were prepared in liquefied phenol, a 9:1 phenol:H2O mixture by volume. Kinetics measurements with $CsH_2PO_4$+0.6 equivalents NaOH (240° C.) were carried out as follows. Samples of p-tert-octylphenol (1.86 grams, 9.0 millimole) and bis(p-cumylphenyl) carbonate (PCPC) were loaded into a single-neck round bottom flask. The reaction vessel was then purged with nitrogen and submersed in a pre-equilibrated silicon oil bath at 240° C. for 5 minutes. A "time zero" aliquot was then taken by pipette followed by the addition of the catalyst solution (45 microliters of a 2 millimolar solution, 20 ppm with respect to PCPC) by syringe. Samples were taken periodically over a 40 minute reaction period and analyzed by HPLC. The data reveal higher rate constants for the mixed alkali metal phosphate catalysts of the present invention relative to catalysts comprising cesium phosphate alone.

TABLE 5

MODEL REACTION KINETICS FOR MIXED ALKALI METAL PHOSPHATE CATALYSTS COMPRISING CESIUM AND SODIUM

| Catalyst | Temp. (° C.) | Catalyst Loading (ppm) | Rate Constant[a] $k_1$ | Ea (kcal/mol) | A ([L/mol]² /min) | Predicted[a] $k^{300}$ |
|---|---|---|---|---|---|---|
| A[b] | 240 | 20 | 2918 | 25.58 | 2.27 × 10¹⁴ | 40168 |
| A | 220 | 20 | 1049 | | | |
| A | 200 | 20 | 350 | | | |
| B[c] | 240 | 20 | 1095 | 18.37 | 1.01 × 10¹¹ | 10044 |
| B | 220 | 20 | 649 | | | |
| B | 200 | 20 | 352 | | | |
| C[d] | 240 | 20 | 1210 | 21.52 | 1.76 × 10¹² | 10928 |
| C | 220 | 20 | 499 | | | |
| C | 200 | 20 | 203 | | | |
| D[e] | 240 | 20 | 349 | 12.30 | 6.1 × 10⁷ | 1248 |
| D | 220 | 20 | 220 | | | |
| D | 200 | 20 | 126 | | | |

[a]Rate constant per ppm unit catalyst (L²/[mol².min]).
[b]Catalyst A = $CsH_2PO_4$ + 0.6 equiv. NaOH
[c]Catalyst B = $CsH_2PO_4$ + 0.4 equiv. NaOH
[d]Catalyst C = $CsH_2PO_4$ + 0.2 equiv. NaOH
[e]Catalyst D = $CsH_2PO_4$ without added sodium hydroxide Table 6 below provides analogous kinetic data for mixed alkali metal phosphate catalysts comprising potassium and sodium. As in Table 5, the data demonstrate the greater inherent catalytic activity of the mixed alkali metal phosphates relative to the salts of phosphoric acid containing a single alkali metal ion.

TABLE 6

MODEL REACTION KINETICS FOR MIXED ALKALI METAL PHOSPHATE CATALYSTS COMPRISING POTASSIUM AND SODIUM

| Catalyst | Temp. (° C.) | Catalyst Loading (ppm) | Rate Constant[a] $k_1$ | Ea (kcal/mol) | A ([L/mol]² /min) | Predicted[a] $k^{300}$ |
|---|---|---|---|---|---|---|
| E[b] | 240 | 56 | 5973 | 1946 | 1.12 × 10¹² | 42634 |
| E | 220 | 56 | 2606 | | | |
| E | 200 | 56 | 1118 | | | |
| F[c] | 240 | 56 | 40 | | | |

[a]Rate constant per ppm unit catalyst (L²/[mol².min]).
[b]Catalyst E = $KH_2PO_4$ + 0.8 equivalents NaOH
[c]Catalyst F = $KH_2PO_4$ without added sodium hydroxide The invention has been described in detail with particular reference to preferred embodiments thereof, but it will be understood by those skilled in the art that variations and modifications can be effected within the spirit and scope of the invention.

What is claimed is:

1. A method of preparing polycarbonate, said method comprising reacting under melt polymerization conditions in the presence of a transesterification catalyst at least one dihydroxy aromatic compound and at least one diaryl carbonate, said transesterification catalyst comprising at least one mixed alkali metal salt of phosphoric acid and at least one co-catalyst, said co-catalyst comprising a quaternary ammonium salt, a quaternary phosphonium salt or a mixture thereof.

2. A method according to claim 1 wherein said mixed alkali metal salt comprises at least two alkali metal ions selected from the group consisting of cesium, sodium and potassium alkali metal ions.

3. A method according to claim 2 wherein said salt comprises between about 0.85 and about 1.0 equivalents of cesium and about 0.1 to about 0.6 equivalents of sodium per phosphoric acid equivalent.

4. A method according to claim 1 wherein said mixed alkali metal salt comprises potassium and sodium ions.

5. A method according to claim 4 wherein said salt comprises between about 0.85 and about 1 equivalents of potassium and about 0.1 to about 1.0 equivalents of sodium per phosphoric acid equivalent.

6. A method according to claim 1 wherein said mixed alkali metal salt of phosphoric acid is employed in an amount corresponding to between 1×10⁻⁸ and 1×10⁻³ moles of mixed alkali metal salt of phosphoric acid per mole dihydroxy aromatic compound.

7. A method according to claim 1 wherein said dihydroxy aromatic compound is a bisphenol having structure I

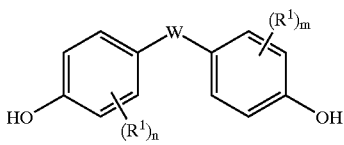

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

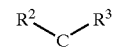

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

8. A method according to claim 7 wherein said bisphenol is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl)cyclohexane; 1,1-bis(4-hydroxy-3-methylphenyl)cyclohexane; and 1,1-bis(4-hydroxyphenyl)-3,3,5-trimethylcyclohexane.

9. A method according to claim 1 wherein said diaryl carbonate has structure II

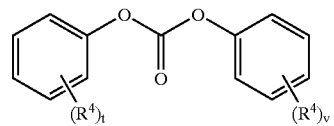

wherein $R^4$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and t and v are independently integers 0–5.

10. A method according to claim 9 wherein said diaryl carbonate is selected from the group consisting of diphenyl carbonate, bis(4-methylphenyl) carbonate, bis(4-chlorophenyl) carbonate, bis(4-fluorophenyl) carbonate, bis (2-chlorophenyl) carbonate, bis(2,4-difluorophenyl) carbonate, bis(4-nitrophenyl) carbonate, bis(2-nitrophenyl) carbonate, and bis(methyl salicyl) carbonate.

11. A method according to claim 1 wherein said quaternary ammonium compound has structure III

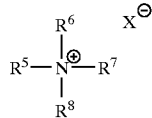

wherein $R^5$–$R^8$ are independently a $C_1$–$C_{20}$ alkyl group, $C_4$–$C_{20}$ cycloalkyl group, or a $C_4$–$C_{20}$ aryl group; and $X^-$ is an organic or inorganic anion.

12. A method according to claim 11 wherein said anion is selected from the group consisting of hydroxide, halide, carboxylate, phenoxide, sulfonate, sulfate, carbonate, and bicarbonate.

13. A method according to claim 11 wherein said quaternary ammonium compound is tetramethylammonium hydroxide.

14. A method according to claim 1 wherein said phosphonium compound has structure IV

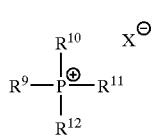

wherein $R^9$–$R^{12}$ are independently a $C_1$–$C_{20}$ alkyl group, $C_4$–$C_{20}$ cycloalkyl group, or a $C_4$–$C_{20}$ aryl group; and $X^-$ is an organic or inorganic anion.

15. A method according to claim 14 wherein said anion is selected from the group consisting of hydroxide, halide, carboxylate, phenoxide sulfonate, sulfate, carbonate, and bicarbonate.

16. A method according to claim 14 wherein said quaternary phosphonium compound is tetrabutylphosphonium hydroxide.

17. A method according to claim 11 wherein said reacting under melt polymerization conditions in the presence of a transesterification catalyst at least one dihydroxy aromatic compound and at least one diaryl carbonate is carried out in the presence of one or more branching agents.

18. A method according to claim 17 wherein said branching agent is 1,1,1-tris(4-hydroxyphenyl)ethane.

19. A method according to claim 1 wherein said reacting under melt polymerization conditions in the presence of a transesterification catalyst at least one dihydroxy aromatic compound and at least one diaryl carbonate is carried out in the presence of at least one endcapping agent.

20. A method according to claim 19 wherein said endcapping agent is a hydroxy aromatic compound.

21. A method according to claim 20 wherein said hydroxy aromatic compound is selected from the group consisting of phenol, p-tert-butylphenol, p-cumylphenol, and cardanol.

22. A method according to claim 1 wherein the product polycarbonate contains less than about 1000 parts per million Fries product.

23. A method according to claim 1 which is a continuous process.

24. A method according to claim 1 which is a batch process.

25. A method for the preparation of polycarbonate, said method comprising contacting at least one dihydroxy aromatic compound with at least one diaryl carbonate under melt polymerization conditions in the presence of a transesterification catalyst, said transesterification catalyst comprising at least one mixed alkali metal salt of phosphoric acid and at least one co-catalyst, said co-catalyst comprising a quaternary ammonium salt, a quaternary phosphonium salt or a mixture thereof, said contacting being carried out in at least two stages.

26. A method according to claim 25 wherein said two stages consist of an oligomerization stage which affords an oligomeric polycarbonate having a number average molecular weight of from about 1000 to about 7500 daltons, and at least one subsequent polymerization stage wherein said oligomeric polycarbonate is converted into a high molecular weight polycarbonate having a number average molecular weight of from about 8000 to about 25000 daltons.

27. A method according to claim 26 wherein said mixed alkali metal salt comprises at least two alkali metal ions selected from the group consisting of cesium, sodium and potassium alkali metal ions.

28. A method according to claim 27 wherein said salt comprises between about 0.85 and about 1.0 equivalents of cesium and about 0.1 to about 0.6 equivalents of sodium per phosphoric acid equivalent.

29. A method according to claim 28 wherein said mixed alkali metal salt is employed in an amount corresponding to between $1\times10^{-8}$ and $1\times10^{-3}$ moles mixed alkali metal salt catalyst per mole dihydroxy aromatic compound.

30. A method according to claim 26 wherein said diphenyl carbonate is employed in an amount corresponding to between about 0.95 moles and about 1.1 moles of diaryl carbonate per mole of dihydroxy aromatic compound.

31. A method according to claim 26 wherein said dihydroxy aromatic compound is a bisphenol having structure I

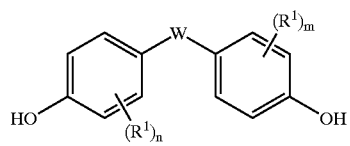

wherein $R^1$ is independently at each occurrence a halogen atom, nitro group, cyano group, $C_1$–$C_{20}$ alkyl group, $C_4$–$C_{20}$ cycloalkyl group, or $C_6$–$C_{20}$ aryl group; n and m are independently integers 0–4; and W is a bond, an oxygen atom, a sulfur atom, a $SO_2$ group, a $C_1$–$C_{20}$ aliphatic radical, a $C_6$–$C_{20}$ aromatic radical, a $C_6$–$C_{20}$ cycloaliphatic radical or the group

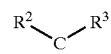

wherein $R^2$ and $R^3$ are independently a hydrogen atom, $C_1$–$C_{20}$ alkyl group, $C_4$–$C_{20}$ cycloalkyl group, or $C_4$–$C_{20}$ aryl group; or $R^2$ and $R^3$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$ aralkyl, $C_5$–$C_{20}$ cycloalkyl groups or a combination thereof.

32. A method according to claim 31 wherein said bisphenol is selected from the group consisting of bisphenol A; 2,2-bis(4-hydroxy-3-methylphenyl)propane; 2,2-bis(3-chloro-4-hydroxyphenyl)propane; 2,2-bis(3-bromo-4-hydroxyphenyl)propane; 2,2-bis(4-hydroxy-3-isopropylphenyl)propane; 1,1-bis(4-hydroxyphenyl) cyclohexane; 1,1-bis(4-hydroxy-3-methylphenyl) cyclohexane; and 1,1-bis(4-hydroxyphenyl)-3,3,5-trimethylcyclohexane.

33. A method according to claim 26 wherein said diaryl carbonate has structure II

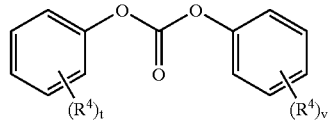

wherein $R^4$ is independently at each occurrence a halogen atom, nitro group, cyano group, $C_1$–$C_{20}$ alkyl group, $C_1$–$C_{20}$ alkoxy carbonyl group, $C_4$–$C_{20}$ cycloalkyl group, or $C_6$–$C_{20}$ aryl group; and t and v are independently integers 0–5.

34. A method according to claim 33 wherein said diaryl carbonate is selected from the group consisting of diphenyl carbonate, bis(4-methylphenyl) carbonate, bis(4-chlorophenyl) carbonate, bis(4-fluorophenyl) carbonate, bis(2-chlorophenyl) carbonate, bis(2,4-difluorophenyl) carbonate, bis(4-nitrophenyl) carbonate, bis(2-nitrophenyl) carbonate, and bis(methyl salicyl) carbonate.

35. A method according to claim 26 wherein the product polycarbonate contains less than about 1000 parts per million Fries product.

36. A process according to claim 26 wherein said diaryl carbonate is diphenyl carbonate, and said dihydroxy aromatic compound is bisphenol A.

37. A method of making polycarbonate said method comprising contacting diphenyl carbonate with bisphenol A in the presence of a transesterification catalyst at a temperature in a range between about 180° C. and about 310° C. and a pressure in a range between about 760 and about 1 torr to afford a product bisphenol A polycarbonate, said transesterification catalyst comprising at least one mixed alkali metal salt of phosphoric acid and at least one co-catalyst, said co-catalyst comprising a quaternary ammonium salt, a quaternary phosphonium salt, or a mixture thereof.

38. A method according to claim 37 wherein said mixed alkali metal salt comprises at least two alkali metal ions selected from the group consisting of cesium, sodium and potassium alkali metal ions.

39. A method according to claim 38 wherein said salt comprises between about 0.85 and about 1.0 equivalents of cesium and about 0.1 to about 0.6 equivalents of sodium per phosphoric acid equivalent.

40. A method according to claim 37 wherein said mixed alkali metal salt comprises potassium and sodium ions.

41. A method according to claim 40 wherein said salt comprises between about 0.85 and about 1 equivalents of potassium and about 0.1 to about 1.0 equivalents of sodium per phosphoric acid equivalent.

42. A method according to claim 37 wherein said mixed alkali metal salt is employed in an amount corresponding to between $1\times10^{-8}$ and $1.0\times10^{-3}$ moles mixed alkali metal salt catalyst per mole of bisphenol A.

43. A method according to claim 31 wherein said contacting is carried out in a first and a second stage, said first stage being an oligomerization stage which affords an oligomeric polycarbonate having a number average molecular weight of from about 1000 to about 7500 daltons, said second stage comprising converting the oligomeric polycarbonate formed in said first stage into a high molecular weight polycarbonate having a number average molecular weight of from about 8000 to about 25000 daltons.

* * * * *